(12) United States Patent
Mohan et al.

(10) Patent No.: US 11,165,488 B2
(45) Date of Patent: Nov. 2, 2021

(54) ENHANCED INTERNET OF THINGS RELAY DATA RE-TRANSMISSION

(71) Applicant: QUALCOMM Incorporated, San Diego, CA (US)

(72) Inventors: Prashanth Mohan, Chennai (IN); Naveen Kumar Pasunooru, Hyderabad (IN); Raevanth Venkat Annam, Hyderabad (IN); Pankaj Gupta, Hyderabad (IN); KrishnaKumar Vasanthasenan, Hyderabad (IN); Ashish Shankar Iyer, San Diego, CA (US); Srinivasan Rajagopalan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 16/180,748

(22) Filed: Nov. 5, 2018

(65) Prior Publication Data
US 2019/0140731 A1    May 9, 2019

Related U.S. Application Data

(60) Provisional application No. 62/583,264, filed on Nov. 8, 2017.

(51) Int. Cl.
| | | |
|---|---|---|
| H04B 7/14 | (2006.01) | |
| H04L 5/00 | (2006.01) | |
| H04L 29/06 | (2006.01) | |
| H04L 1/18 | (2006.01) | |
| H04B 7/155 | (2006.01) | |
| H04W 12/10 | (2021.01) | |
| H04W 88/04 | (2009.01) | |
| H04L 1/00 | (2006.01) | |

(Continued)

(52) U.S. Cl.
CPC ........... *H04B 7/14* (2013.01); *H04B 7/15528* (2013.01); *H04L 1/1819* (2013.01);
(Continued)

(58) Field of Classification Search
CPC ..... H04B 7/14; H04B 7/15528; H04L 1/1819; H04L 5/0055; H04L 63/0428;
(Continued)

(56) References Cited

U.S. PATENT DOCUMENTS

2008/0182581 A1* 7/2008 Ishikawa ............... H04W 36/18
455/442
2008/0317017 A1* 12/2008 Wiemann .............. H04L 1/0002
370/389

(Continued)

FOREIGN PATENT DOCUMENTS

| EP | 2109246 A2 | 10/2009 |
|---|---|---|
| EP | 2416518 A1 | 2/2012 |
| WO | WO-2010056067 A2 | 5/2010 |

OTHER PUBLICATIONS

International Search Report and Written Opinion—PCT/US2018/059425—ISA/EPO—dated Jan. 25, 2019.

*Primary Examiner* — Will W Lin
(74) *Attorney, Agent, or Firm* — Arent Fox LLP

(57) ABSTRACT

A method, an apparatus, and a non-transitory computer readable medium for receiving data and one or more redundant equivalent versions of the data from a remote user equipment (UE), buffering the data and the one or more redundant equivalent versions of the data, transmitting the data to a base station, receiving at least one negative acknowledgement, relating to the data, from the base station indicating an unsuccessful reception of the data; and transmitting, in response to receiving the at least one negative acknowledgement, at least one of the one or more redundant equivalent versions of the data to the base station.

28 Claims, 7 Drawing Sheets

(52) U.S. Cl.
CPC ........ *H04L 5/0055* (2013.01); *H04L 63/0428* (2013.01); *H04L 2001/0097* (2013.01); *H04L 2209/80* (2013.01); *H04W 12/10* (2013.01); *H04W 88/04* (2013.01)

(58) Field of Classification Search
CPC ....... H04L 2001/0097; H04L 2209/80; H04W 12/10; H04W 88/04
See application file for complete search history.

(56) References Cited

U.S. PATENT DOCUMENTS

| | | | | |
|---|---|---|---|---|
| 2010/0017672 A1* | 1/2010 | Suga | ................... | H04L 1/1887 714/748 |
| 2010/0080139 A1* | 4/2010 | Palanki | .............. | H04B 7/15557 370/252 |
| 2010/0322136 A1* | 12/2010 | Kanazawa | .......... | H04L 12/1868 370/312 |
| 2012/0008545 A1* | 1/2012 | Zhang | ................... | H04L 1/1829 370/315 |
| 2012/0033609 A1* | 2/2012 | Suda | ....................... | H04B 7/155 370/315 |
| 2013/0262788 A1* | 10/2013 | Zhang | ................... | G06F 3/0611 711/151 |
| 2016/0315832 A1* | 10/2016 | Hu | .......................... | H04L 25/20 |
| 2016/0337971 A1* | 11/2016 | Bhargava | ............. | H04W 28/021 |
| 2017/0244521 A1* | 8/2017 | Lim | ...................... | H04L 1/1819 |
| 2019/0028232 A1* | 1/2019 | Kalhan | ................ | H04L 1/0014 |
| 2019/0089558 A1* | 3/2019 | Hirose | ............. | H04L 12/40091 |
| 2019/0288770 A1* | 9/2019 | Martin | .................. | H04L 1/1832 |

* cited by examiner

ENHANCED INTERNET OF THINGS RELAY DATA RE-TRANSMISSION

CROSS-REFERENCE TO RELATED APPLICATIONS

The current application claims priority to U.S. Provisional Application No. 62/583,264, entitled "Enhanced Internet of Things Relay Data Re-Transmission," filed on Nov. 8, 2017, the content of which is incorporated by reference in its entirety.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

These multiple access technologies have been adopted in various telecommunication standards to provide a common protocol that enables different wireless devices to communicate on a municipal, national, regional, and even global level. For example, 5G NR (new radio) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with requirements, especially in terms of latency and reliability; and massive machine type communications for a very large number of connected devices, and typically transmitting a relatively low volume of non-delay-sensitive information. However, as the demand for mobile broadband access continues to increase, there exists a need for further improvements in 5G communications technology and beyond. Preferably, these improvements should be applicable to other multi-access technologies and the telecommunication standards that employ these technologies.

Internet of things (IoT) includes a network of physical devices that exchange information via the wireless communication networks. IoT may include a number of remote user equipment (UE) that encompass various technologies such as sensors, actuators, smart grids, smart homes, intelligent transportation, and smart cities. During operation, the remote UEs may upload information to other devices in the IoT or to the users of the remote UEs. Since many remote UEs are equipped with minimal circuitry and battery, they may not be able to communicate directly with the wireless communication networks, and rely on relay UEs, such as a cellular phone, to communicate with the wireless networks.

Remote UEs frequently utilize device-to-device (D2D) communication to exchange information with other remote UEs or relay UEs. D2D may not require a base station (BS) and/or cellular network when transmitting information to relay UEs. This communication typically utilizes cellular frequencies or other unlicensed bands. Since D2D communication bypasses conventional cellular network when exchanging information, extensive use of D2D may improve spectrum utilization, overall throughput, and energy efficiency of the network while maintaining sufficiently fast information exchange.

In conventional approaches, to upload information to cellular networks, relay UEs (e.g., smart phones) may be utilized to relay uplink data from remote UEs. While relaying information through D2D is very useful in remote UEs as their usable patterns involve close proximity to the relay UEs, having a direct radio interface (Uu) connection may make the wearable consume a significant amount power. The Uu connection may be a direct interface between UEs and/or UE and a base station. This may detrimentally impact the battery performance To simplify electronics (e.g., omitting receiver in remote UEs) and reduce power consumption, many remote UEs typically only support unidirectional D2D link, specifically uplink from the remote UE (wearable) to the relay UE. Because uplink only transmission to UEs does not have a feedback mechanism, in-case of bad radio conditions (e.g., receiving one or more negative acknowledgement (NACKs)), the relay UEs might not be able to compensate for the bad radio conditions. As a result, mission critical data may be lost due to the bad radio conditions. Therefore, there is a desire for a method and an apparatus to improve transmission integrity for remote UEs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A method for receiving data and one or more redundant equivalent versions of the data from a remote UE, buffering the data and the one or more redundant equivalent versions of the data, transmitting the data to a base station, receiving at least one negative acknowledgement, relating to the data, from the base station indicating an unsuccessful reception of the data; and transmitting, in response to receiving the at least one negative acknowledgement, at least one of the one or more redundant equivalent versions of the data to the base station.

A relay user equipment may include a memory storing instructions, a transceiver, and one or more processors coupled with the memory and the transceiver, and configured to execute the instructions to receive, via the transceiver, data and one or more redundant equivalent versions of the data from a remote user equipment, buffer the data and the one or more redundant equivalent versions of the data, transmit, via the transceiver, the data to a base station, receive at least one negative acknowledgement, relating to the data, from the base station indicating an unsuccessful reception of the data, and transmit, via the transceiver, in response to receiving the at least one negative acknowledgement, at least one of the one or more one redundant equivalent versions of the data to the base station.

A computer readable medium including instructions that, when executed by one or more processors of a relay user equipment, may cause the one or more processor to receive data and one or more redundant equivalent versions of the data from a remote user equipment, transmit the data to a base station, receive at least one negative acknowledgement, relating to the data, from the base station indicating an unsuccessful reception of the data, and transmit in response to receiving the at least one negative acknowledgement, at least one of the one or more redundant equivalent versions of the data to the base station.

A relay user equipment for relaying data may include means for receiving data and one or more redundant equivalent versions of the data from a remote user equipment, means for buffering the data and the one or more redundant equivalent versions of the data, means for transmitting the data to a base station, means for receiving at least one negative acknowledgement, relating to the data, from the base station indicating an unsuccessful reception of the data by the base station, and means for transmitting, in response to receiving the at least one negative acknowledgement, at least one of the one or more redundant equivalent versions of the data to the base station.

A method, an apparatus, and a computer readable medium for transmitting data and/or one or more redundant equivalent versions of the data may include generating one or more redundant equivalent versions of data and transmitting the data and the one or more redundant equivalent versions to a relay UE.

A method, an apparatus, and a computer readable medium for receiving data and/or one or more redundant equivalent versions of the data may include receive data from a relay UE, transmitting at least one NACK, relating to the data, to the relay UE indicating an unsuccessful reception of the data by the base station, receiving at least one of the one or more redundant equivalent versions of data from the relay UE, and receiving another one of the one or more redundant equivalent versions of data from the relay UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
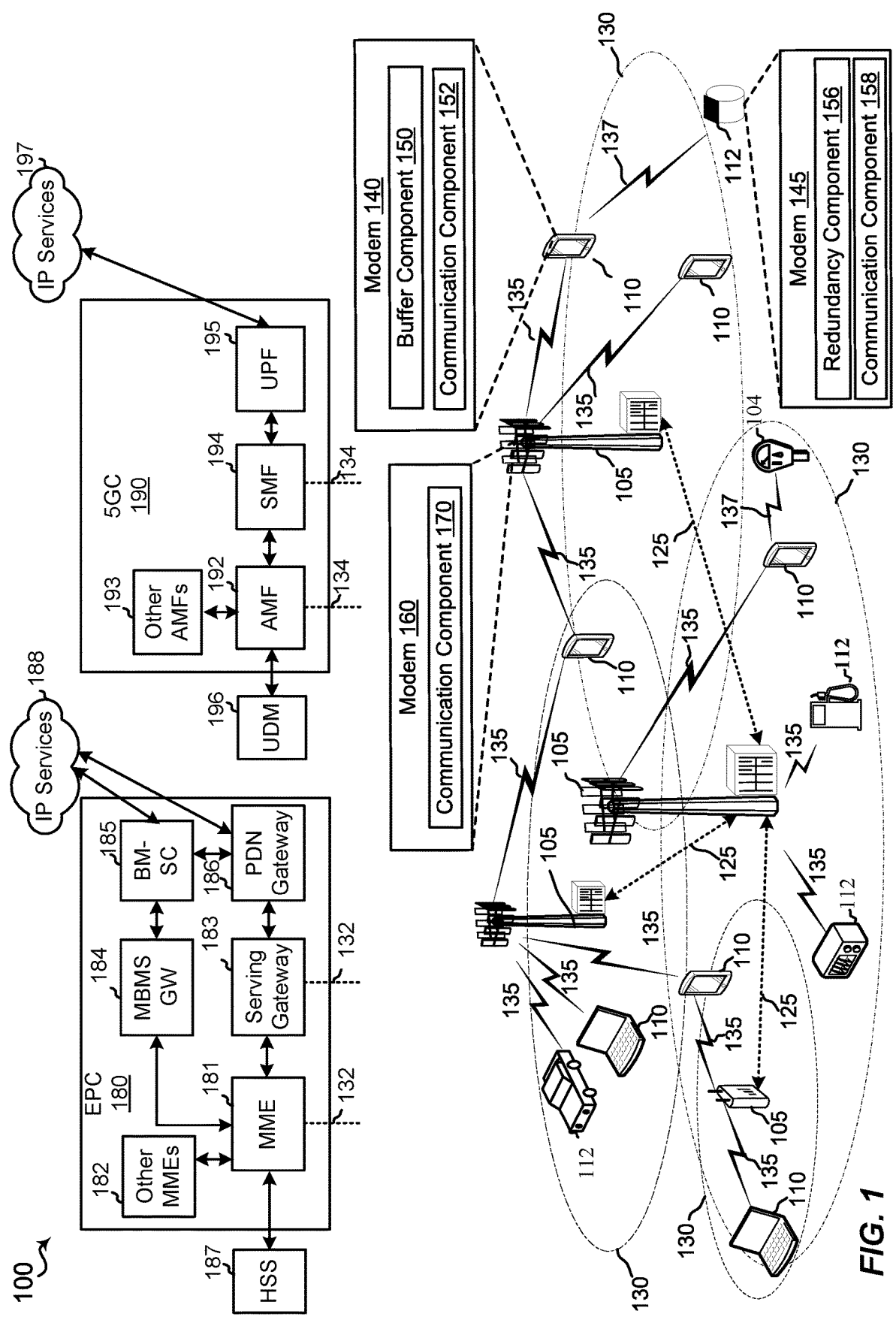
FIG. 1 is a schematic diagram of an example of a wireless communication network including at least one base station, at least one relay UE, and at least one remote UE.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatuses and methods. These apparatuses and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium, such as a computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

An aspect of the present disclosure may include a remote UE transmitting data, including the original (RV0) and redundancy versions (RV1, RV2, and RV3) in encrypted or unencrypted format, to a relay UE, which forwards the data to a network. The relay UE buffers certain transmission from the remote UE, which may be used for retransmission later upon receiving a first negative acknowledgement due to bad radio conditions, for example. In response to the reception of the one or more NACKs, the relay UE may transmit at least one of the redundant versions of the data (e.g., 1-5 redundant versions) to ensure reliable data transmission. Bad radio conditions may be when the relay UE receives a predetermined number, such as two, three, four, or more, negative acknowledgements (NACKs) from a base station for the data sent. The data may include priority and/or scheduling data. The relay UE may schedule or buffer the data to be sent. As such, the data may be sent in good radio conditions, thereby reducing the number of retransmissions. Further, this approach may utilize lossless transmission of the remote UE's data, and reduce the possibility and/or frequency that mission critical data is lost. Good radio conditions may occur when the relay UE receives an acknowledgement (ACK) from the base station.

Additional features of the present aspects are described in more detail below with respect to FIGS. 1-5.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 302.11 (Wi-Fi), IEEE 302.16 (WiMAX), IEEE 302.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

In some implementations, the remote UE may be unable to directly transmit data to the base station due to bad or adverse radio conditions, insufficient transmission power, or other factors. Instead, the remote UE may transmit the data, along with one or more redundant equivalent versions of the data, to the relay UE. The relay UE may relay the data to the base station. If the base station fails to properly receive the data, the relay UE may transmit the one or more redundant equivalent versions of the data to the base station.

Referring to FIG. 1, in accordance with various aspects of the present disclosure, the wireless communication network 100 may include one or more base stations 105, one or more relay UEs 110, at least one remote UE 112, and a core network 115. The remote UE 112 may transmit data to the relay UE 110 over a wireless communication link 137, which relays the data to the base station 105 over a wireless communication link 135. In the presence of bad radio conditions over the wireless communication link 135, the relay UE 110 may buffer data sent by the remote UE 112 and send redundant data to the base station 105 to minimize data loss.

The remote UE 112 may be configured to establish the wireless communication link 137 with the relay UE 110. The wireless communication links 137 may carry uplink (UL) transmissions from the remote UE 112 to the relay UE 110. The wireless communication link 137 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication link 137 may transmit unidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication link 137 may represent one or more broadcast channels.

The remote UE 112 may be a smart watch, a smart glasses, a personal digital assistant, a fitness tracker, a hearing aid, a speech and voice device, a sport tracker, a health monitor, a navigational tool, a media device, a communication gadget, a speaker, or other suitable smart and/or communication devices that transmit data and/or redundant versions of the data to the relay UE.

Specifically, the relay UE 110 may include a modem 140, a buffer component 150, and a communication component 152. The buffer component 150 may buffer received data in local storage. The communication component 152 may send and/or receive data via transceivers within the relay UE 110.

The base station 105 may include a modem 160 and a communication component 170. The communication component 170 may transmit and receive data, for example, such as transmitting an ACK or NACK and receiving original and redundant data from the relay UE 110. The remote UE 112 may include a modem 145, a redundancy component 156, and a communication component 158. The redundancy component 156 may create redundant equivalent versions of data. The communication component 158 may transmit data, for example, such as transmitting data to the relay UE 110. The data and the redundant equivalent versions may be encrypted. In some examples, the data may include priority data indicating an order to send portions or sub-portions of the data. For example, the data may include a first sub-portion, a second sub-portion, and a third sub-portion, and priority data indicating that the second sub-portion has the highest priority and the first sub-portion has the lowest priority. Further, the data may include timing data indicating a permissible delay the relay UE 110 may wait before transmitting the data.

The modems 140, 160, 145 may be configured to communicate via a cellular network, a Wi-Fi network, or other wireless and wired networks. The modems 140, 160 may receive and transmit data via transceivers. The modem 145 may transmit data via a transmitter and/or transceiver (if available).

The base station 105, the relay UE 110, and the remote UE 112 may communicate via a network having an Evolved Packet Core (EPC) 180 or a Fifth Generation Core (5GC) 190. The EPC 180 or the 5GC 190 may provide user authentication, access authorization, tracking, internet protocol (IP) connectivity, and other access, routing, or mobility functions. The base stations 105 configured for 4G LTE (collectively referred to as Evolved Universal Mobile Telecommunications System (UMTS) Terrestrial Radio Access Network (E-UTRAN)) may interface with the EPC 180 through backhaul links 132 (e.g., 51, etc.). The base stations 105 configured for 5G NR (collectively referred to as Next Generation RAN (NG-RAN)) may interface with the 5GC 190 through backhaul links 134. In addition to other functions, the base stations 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 105 may communicate with each other directly or indirectly (e.g., through EPC 180 or the 5GC 190) over backhaul links 132, 134 (e.g., X2 interface). The backhaul links 132, 134 may be wired or wireless communication links.

The base stations 105 may wirelessly communicate with the relay UEs 110 via one or more base station antennas. Each of the base stations 105 may provide communication coverage for a respective geographic coverage area 130. In some examples, the base stations 105 may be referred to as a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term relay UE may be generally used to describe the relay UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that maybe used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by relay UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the relay UEs 110 with service subscriptions with the network provider. A femto cell may also cover a small geographic area (e.g., a home) and may provide restricted access and/or unrestricted access by the relay UEs 110 having an association with the femto cell (e.g., in the restricted access case, the relay UEs 110 in a closed subscriber group (CSG) of the base station 105, which may include the relay UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a relay UE 110 and the base stations 105. The RRC protocol layer may also be used for EPC 180 or the 5GC 190 support of radio bearers for the user plane data. At the physical (PHY) layer, the transport channels may be mapped to physical channels.

The relay UEs 110 may be dispersed throughout the wireless communication network 100, and each relay UE 110 may be stationary or mobile. A relay UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A relay UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Some non-limiting examples of UEs 110 may include a session initiation protocol (SIP) phone, a satellite radio, a global positioning system, a multimedia device, a video device, a digital audio player (e.g., MP3 player), a camera, a game console, a smart device, a wearable device, a vehicle, an electric meter, a gas pump, a large or small kitchen appliance, a healthcare device, an implant, a sensor/actuator, a display, or any other similar functioning device. Additionally, a relay UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other relay UEs. Some examples of IoT devices may include parking meter, gas pump, toaster, vehicles, and heart monitor. A relay UE 110 may be able to communicate with various types of base stations 105 and network equipment including macro eNBs, small cell eNBs, macro gNBs, small cell gNBs, relay base stations, and the like.

A relay UE 110 may be configured to establish one or more wireless communication links 135 with one or more base stations 105. The wireless communication links 135 shown in wireless communication network 100 may carry uplink (UL) transmissions from a relay UE 110 to a base station 105, or downlink (DL) transmissions, from a base station 105 to a relay UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or relay UEs 110 may include multiple antennas for employing antenna diversity schemes to improve communication quality and reliability between base stations 105 and relay UEs 110. Additionally or alternatively, base stations 105 or relay UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A relay UE 110 may be configured with multiple downlink CCs and one or more uplink CCs for carrier aggregation. Carrier aggregation may be used with both FDD and TDD component carriers. The communication links 135 may use multiple-input and multiple-output (MIMO) antenna technology, including spatial multiplexing, beamforming, and/or transmit diversity. The base stations 105 and/or relay UEs 110 may use spectrum up to Y MHz (e.g., 5, 10, 15, 20, 30, 50, 100, 200, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain relay UEs 110 and/or remote UEs 112 may communicate with each other using device-to-device (D2D) communication link 138. The D2D communication link 138 may use the DL/UL WWAN spectrum. The D2D communication link 138 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications network 100 may further include base stations 105 operating according to Wi-Fi technology, e.g., Wi-Fi access points, in communication with the relay UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

The small cell may operate in a licensed and/or an unlicensed frequency spectrum. When operating in an unlicensed frequency spectrum, the small cell may employ NR and use the same 5 GHz unlicensed frequency spectrum as used by the Wi-Fi AP. The small cell, employing NR in an unlicensed frequency spectrum, may boost coverage to and/or increase capacity of the access network.

A base station 105, whether a small cell or a large cell (e.g., macro base station), may include an eNB, gNodeB (gNB), or other type of base station. Some base stations 105, such as gNB 180 may operate in a traditional sub 6 GHz spectrum, in millimeter wave (mmW) frequencies and/or near mmW frequencies in communication with the relay UE 110. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band has extremely high path loss and a short range. The mmW base station 105 may utilize beamforming with the relay UEs 110 and/or the remote UEs 112 to compensate for the extremely high path loss and short range.

In a non-limiting example, the EPC 180 may include a Mobility Management Entity (MME) 181, other MMEs 182, a Serving Gateway 183, a Multimedia Broadcast Multicast Service (MBMS) Gateway 184, a Broadcast Multicast Service Center (BM-SC) 185, and a Packet Data Network (PDN) Gateway 186. The MME 181 may be in communication with a Home Subscriber Server (HSS) 187. The MME 181 is the control node that processes the signaling between the UEs 110 and the EPC 180. Generally, the MME 181 provides bearer and connection management. All user Internet protocol (IP) packets are transferred through the Serving Gateway 183, which itself is connected to the PDN Gateway 186. The PDN Gateway 186 provides UE IP address allocation as well as other functions. The PDN Gateway 186 and the BM-SC 185 are connected to the IP Services 188. The IP Services 188 may include the Internet, an intranet, an IP Multimedia Subsystem (IMS), a PS Streaming Service, and/or other IP services. The BM-SC 185 may provide functions for MBMS user service provisioning and delivery. The BM-SC 185 may serve as an entry point for content provider MBMS transmission, may be used to authorize and initiate MBMS Bearer Services within a public land mobile network (PLMN), and may be used to schedule MBMS transmissions. The MBMS Gateway 184 may be used to distribute MBMS traffic to the base stations 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

Figure 2:
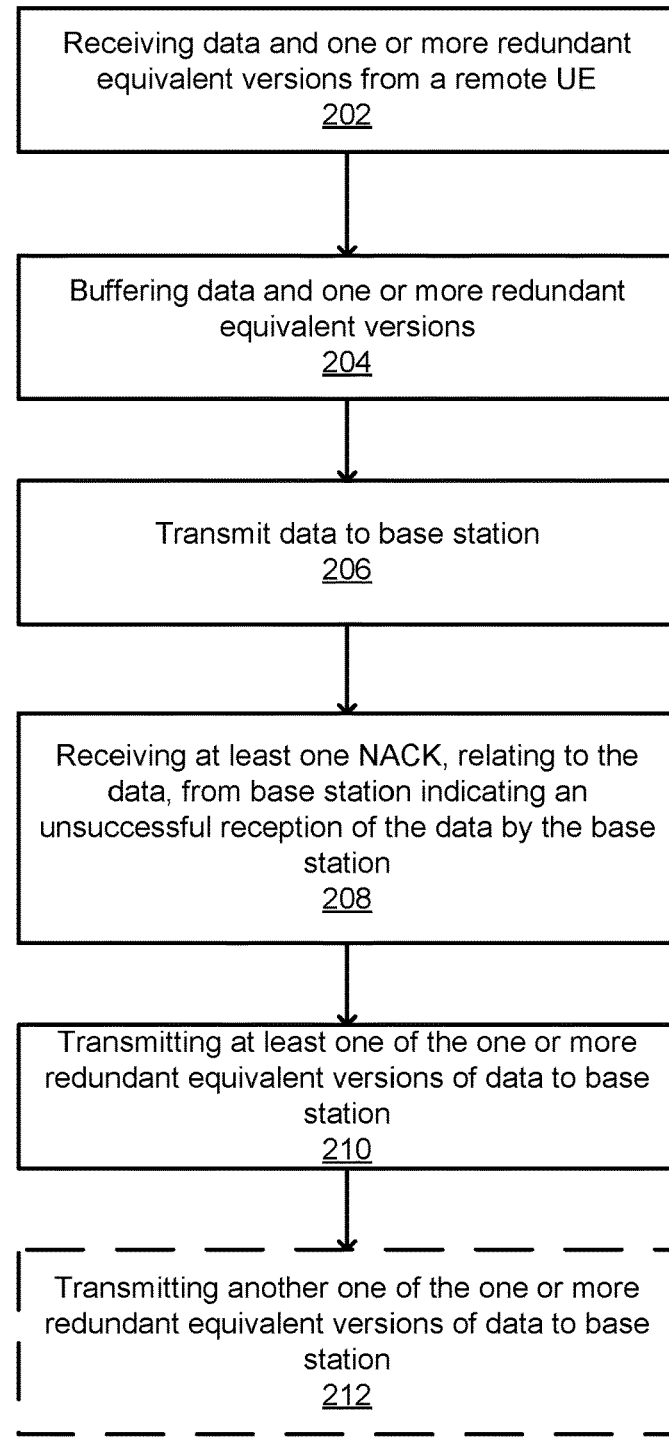
FIG. 2 is a flow diagram of an example method of relaying data for retransmission.

Referring to FIG. 2, for example, a method 200 of relaying data for retransmission includes operating the relay UE 110 including the buffer component 150 and the communication component 152 according to the above-described aspects and according to one or more of the herein-defined actions. The one or more processors 312 may, in conjunction with the buffer component 150 and the communication component 152 may perform the one or more of the herein-defined actions. The remote UE 112, such as a wearable device, may be unable to directly transmit the data to the base station 105 due to bad radio conditions, insufficient transmission power at the remote UE 112, obstruction and/or interference between the remote UE 112 and the base station 105, or other factors. The remote UE 112 may be unable to directly transmit the data at a sufficient transmission rate (e.g., based on the need of a user of the remote UE 112) to the base station 105. The relay UE 110 may be able to communicate with the base station 105 at a higher transmission rate than the transmission rate from the remote UE 112 to the base station, and relay the data to the base station for the remote UE 112.

At block 202, the method 200 may receive data and one or more redundant equivalent versions of the data from the remote UE 112. For example, the communication component 152 of the relay UE 110 may receive, via one or more antennas 365, a RF front end 388, a transceiver 302 or a receiver 306, the processor 312, and/or the modem 140, the data and one or more redundant equivalent versions sent by the remote UE 112. The one or more antennas 365 may receive electro-magnetic signals containing the data from one or more antennas 565 of the remote UE 112. The RF front end 388 may filter, amplify, and/or extract electrical signals carried by the electro-magnetic signals. The transceiver 302 or the receiver 306 may digitize and convert the electrical signal into the data and the one or more redundant equivalent versions of the data. The processor 312, the modem 140, and/or the communication component 152 of the relay UE 110 may receive the data and/or the data and the one or more redundant equivalent versions of the data from the transceiver 302 or the receiver 306.

In one aspect, the communication component 152 may receive the data and three redundant versions of the data. For example, the communication component 152 may receive decimal numbers 15, 30, and 45 as the data and three redundant equivalent versions of the data, binary numbers 001111, 011110, and 101101, hexadecimal numbers F, 1E, 2D, and decimal numbers 15, 30, and 45, as the one or more redundant equivalent versions sent by a transmitter 502 of the remote UE 112. The one or more redundant equivalent versions of the data may have the same or different representations as the data. In some examples, the one or more redundant equivalent versions of the data may be identical to the data (i.e., decimal number 15, 30, and 45 for all three versions). In certain implementations, the one or more redundant equivalent versions of the data may be encrypted using existing algorithms known to one skilled in the art. Other numbers of redundant equivalent versions of the data may be possible, such as 1, 2, 5, 10, or more.

At block 204, the method 200 may buffer the received data and the one or more redundant equivalent versions of the data sent by the remote UE 112. For example, the buffer component 150 of the relay UE 110 may buffer, via the processor 312, the memory 316, and/or the modem 140, the received data and the one or more redundant equivalent versions sent by the remote UE 112. The processor 312 may store, temporarily, the received data and the one or more redundant equivalent versions of the data in the memory 316 or other permanent or temporary storage devices (e.g., the cache of the processor 312, external storage, network storage). For example, the buffer component 150 of the relay UE 110 may buffer the decimal numbers 15, 30, and 45 and the redundant equivalent versions of binary numbers 001111, 011110, and 101101, hexadecimal numbers F, 1E, 2D, and the decimal numbers 15, 30, and 45.

At block 206, the method 200 may transmit the data to the base station 105. For example, the communication component 152 of the relay UE 110 may transmit, via the one or more antennas 365, the RF front end 388, the transceiver 302 or a transmitter 308, the processor 312, and/or the modem 140, the decimal numbers 15, 30, and 45 to the base station 105. The communication component 152, the modem 140, and/or the processor 312 of the relay UE 110 may transmit the data to the transceiver 302 or the transmitter 308. The transceiver 302 or the transmitter 308 may convert the data into analog signals. The RF front end 388 may filter, amplify, and package the analog signals sent by the transceiver 302 or the transmitter 308. The RF front end 388 may cause the one or more antennas 365 to emit electro-magnetic signals containing the data to one or more antennas 465 of the base station 105. The relay UE 110 may transmit the sub-portions of the data according to their priority. The relay UE 110 may encrypt the data before transmission.

At block 208, the method 200 may receive at least one negative acknowledgement (NACK), relating to the data, from the base station 105 indicating an unsuccessful reception of the data by the base station 105. For example, the communication component 152 of the relay UE 110 may receive, via the one or more antennas 365, the RF front end 388, the transceiver 302 or the receiver 306, the processor 312, and/or the modem 140, the at least one NACK from the communication component 170 to inform the relay UE 110 that the base station 105 did not receive the data or could not decode the data. The one or more antennas 365 may receive electro-magnetic signals containing the NACK from one or more antennas 565 of the remote UE 112. The RF front end 388 may filter, amplify, and/or extract electrical signals carried by the electro-magnetic signals. The transceiver 302 or the receiver 306 may digitize and convert the electrical signal into the NACK. The processor 312, the modem 140, and/or the communication component 152 of the relay UE 110 may receive the NACK from the transceiver 302 or the receiver 306.

In some non-limiting examples, the relay UE 110 may receive multiple NACKs from the base station 105 indicating that the base station 105 did not receive the data. In another aspect, the at least one NACK may indicate to the relay UE 110 that there was an unsuccessful reception of the data, which may occur when the base station 105 did not receive the data, received corrupted data, or received incomplete data. For example, the reception of a predetermined threshold number of NACKs by the relay UE 110, such as 1, 2, 3, 4, 5, or more NACKs, may indicate bad radio conditions. In some aspects, the method 200 may receive the at least one NACK a certain amount of time after the initial transmission of the data.

At block 210, upon receiving the at least one NACK, in some implementations the method 200 may transmit the at least one of the one or more redundant equivalent versions of the data to the base station 105. For example, the communication component 152 may transmit, via the one or more antennas 365, the RF front end 388, the transceiver 302 or the transmitter 308, the processor 312, and/or the modem 140, the at least one of the one or more redundant equivalent versions of the data to the base station 105. The communication component 152, the modem 140, and/or the processor 312 of the relay UE 110 may transmit the at least one of the one or more redundant equivalent versions of the data to the transceiver 302 or the transmitter 308. The transceiver 302 or the transmitter 308 may convert the at least one of the one or more redundant equivalent versions of the data into analog signals. The RF front end 388 may filter, amplify, and package the analog signals sent by the transceiver 302 or the transmitter 308. Next, the RF front end 388 may cause the one or more antennas 365 to emit electro-magnetic signals containing the at least one of the one or more redundant equivalent versions of the data to one or more antennas 465 of the base station 105. In some examples, the relay UE 110 may not receive any indication from the base station 105, and interprets the lack of indication as a NACK.

In an aspect, the communication component 152 may transmit the binary numbers 001111, 011110, and 101101 to the base station 105. For example, the communication component 152 may transmit the binary numbers 001111, 011110, and 101101 to the base station 105 after the relay UE 110 receives the predetermined threshold number of consecutive NACKs, such as 4 NACKs. The at least one of the one or more redundant equivalent versions of the data may be utilized by the base station 105 to reconstruct the data and/or recover contents of the data. The at least one of the one or more redundant equivalent versions of the data may decrease the chance of loss data. The relay UE 110 may transmit any sub-portions of the data according to their priority. Alternatively or additionally, the relay UE 110 may wait for the bad radio conditions to subside to transmit the data in order to minimize retransmission. In some examples, the relay UE 110 may wait for a predetermined amount of time before sending another redundant equivalent version of the data. The relay UE 110 may encrypt the data before transmission.

In optional implementations, at block 212, the method 200 may optionally transmit another one of the one or more redundant equivalent versions of the data to the base station 105. For example, the communication component 152 may transmit, via the one or more antennas 365, the RF front end 388, the transceiver 302 or the transmitter 308, the processor 312, and/or the modem 140, another one of the one or more redundant equivalent versions of the data to the base station 105. The communication component 152, the modem 140, and/or the processor 312 of the relay UE 110 may transmit the other one of the one or more redundant equivalent versions of the data to the transceiver 302 or the transmitter 308. The transceiver 302 or the transmitter 308 may convert the other one of the one or more redundant equivalent versions of the data into analog signals. The RF front end 388 may filter, amplify, and package the analog signals sent by the transceiver 302 or the transmitter 308. Next, the RF front end 388 may cause the one or more antennas 365 to emit electro-magnetic signals containing the other one of the one or more redundant equivalent versions of the data to one or more antennas 465 of the base station 105.

For example, the communication component 152 may transmit the hexadecimal numbers F, 1E, 2D to the base station 105. The another one of the one or more redundant equivalent versions of the data may be transmitted in response to the relay UE 110 receiving a NACK relating to the at least one of the one or more redundant equivalent versions of the data. The another one of the one or more redundant equivalent versions of the data may be utilized by the base station 105 to reconstruct the data and/or recover contents of the data. The another one of the one or more redundant equivalent versions of the data may decrease the chance of data loss. In certain aspects, the communication component 152 may repeatedly transmit the one or more redundant equivalent versions of the data for a predetermined repetition. In another aspect, the communication component 152 may transmit the one or more redundant equivalent versions of the data until receiving an acknowledgement indicating a successful reception of the data or the one or more redundant equivalent versions of the data by the base station 105.

Figure 3:
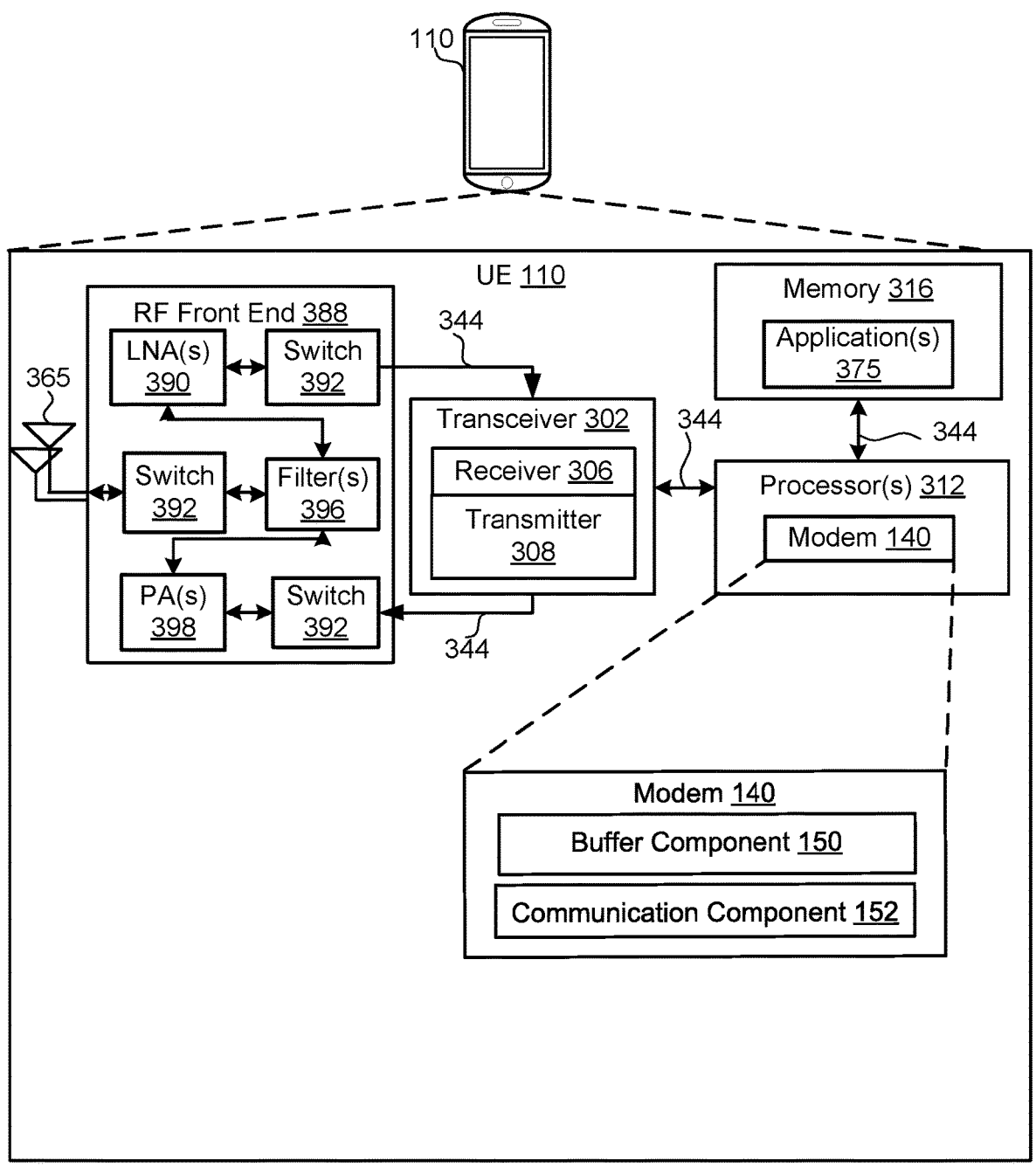
FIG. 3 is a schematic diagram of an example of a user equipment.

Referring to FIG. 3, one example of an implementation of the relay UE 110 may include a variety of components, some of which have already been described above, but including components such as one or more processors 312, memory 316 and the transceiver 302 in communication via one or more buses 344, which may operate in conjunction with a modem 140, the buffer component 150, and/or the communication component 152 to enable one or more of the functions described herein. Further, the one or more processors 312, the modem 140, the memory 316, the transceiver 302, the RF front end 388 and the one or more antennas 365, may be configured to support voice and/or data calls (simultaneously or non-simultaneously) in one or more radio access technologies.

In an aspect, the one or more processors 312 may include a modem 140 that uses one or more modem processors. The various functions related to the buffer component 150 and the communication component 152 may be included in modem 140 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 140 associated with the buffer component 150 and the communication component 152 may be performed by transceiver 302.

Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the buffer component 150 and/or one or more of its subcomponents, and/or data associated therewith, when relay UE 110 is operating at least one processor 312 to execute the buffer component 150 and/or one or more of its subcomponents. In another aspect, for example, memory 316 may be a non-transitory computer-readable storage medium that stores one or more computer-executable codes defining the communication component 152 and/or one or more of its subcomponents, and/or data associated therewith, when the relay UE 110 is operating at least one processor 312 to execute the communication component 152 and/or one or more of its subcomponents. The memory 316 may include applications 375 for executing one or more functions associated with the communication component 152 and/or the buffer component 150.

The transceiver 302 may include at least one receiver 306 and at least one transmitter 308. The receiver 306 may include hardware, firmware, and/or software code executable by a processor for receiving data, the code comprising instructions and being stored in a memory (e.g., computer-readable medium). The receiver 306 may be, for example, a radio frequency (RF) receiver. In an aspect, the receiver 306 may receive signals transmitted by at least one base station 105. Additionally, the receiver 306 may process such received signals, and also may obtain measurements of the signals, such as, but not limited to, Ec/Io, SNR, RSRP, RSSI, etc. The transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the relay UE 110 may include RF front end 388, which may operate in communication with one or more antennas 365 and transceiver 302 for receiving and transmitting radio transmissions, for example, wireless communications transmitted by at least one base station 105 or wireless transmissions transmitted by the relay UE 110.

The RF front end 388 may be communicatively coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, the LNA 390 may amplify a received signal at a desired output level. In an aspect, each LNA 390 may have a specified minimum and maximum gain values. In an aspect, RF front end 388 may use one or more switches 392 to select a particular LNA 390 with a specific gain value based on a desired gain value for a particular application.

Further, for example, one or more PA(s) 398 may be used by the RF front end 388 to amplify a signal for an RF output at a desired output power level. In an aspect, each PA 398 may have specified minimum and maximum gain values. In an aspect, the RF front end 388 may use one or more switches 392 to select a particular PA 398 and its specified gain value based on a desired gain value for a particular application.

Also, for example, one or more filters 396 may be used by the RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be connected to a specific LNA 390 and/or PA 398. In an aspect, the RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, the transceiver 302 may be tuned to operate at specified frequencies such that UE 110 may communicate with, for example, one or more base stations 105 or one or more cells associated with one or more base stations 105. In an aspect, for example, the modem 140 may configure the transceiver 302 to operate at a specified frequency and power level based on the UE configuration of the relay UE 110 and the communication protocol used by the modem 140.

In an aspect, the modem 140 may be a multiband-multimode modem, which may process digital data and communicate with the transceiver 302 such that the digital data is sent and received using transceiver 302. In an aspect, the modem 140 may be multiband and be configured to support multiple frequency bands for a specific communications protocol. In an aspect, the modem 140 may be multimode and be configured to support multiple operating networks and communications protocols. In an aspect, the modem 140 may control one or more components of the relay UE 110 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on UE configuration information associated with the relay UE 110 as provided by the network during cell selection and/or cell reselection.

Figure 4:
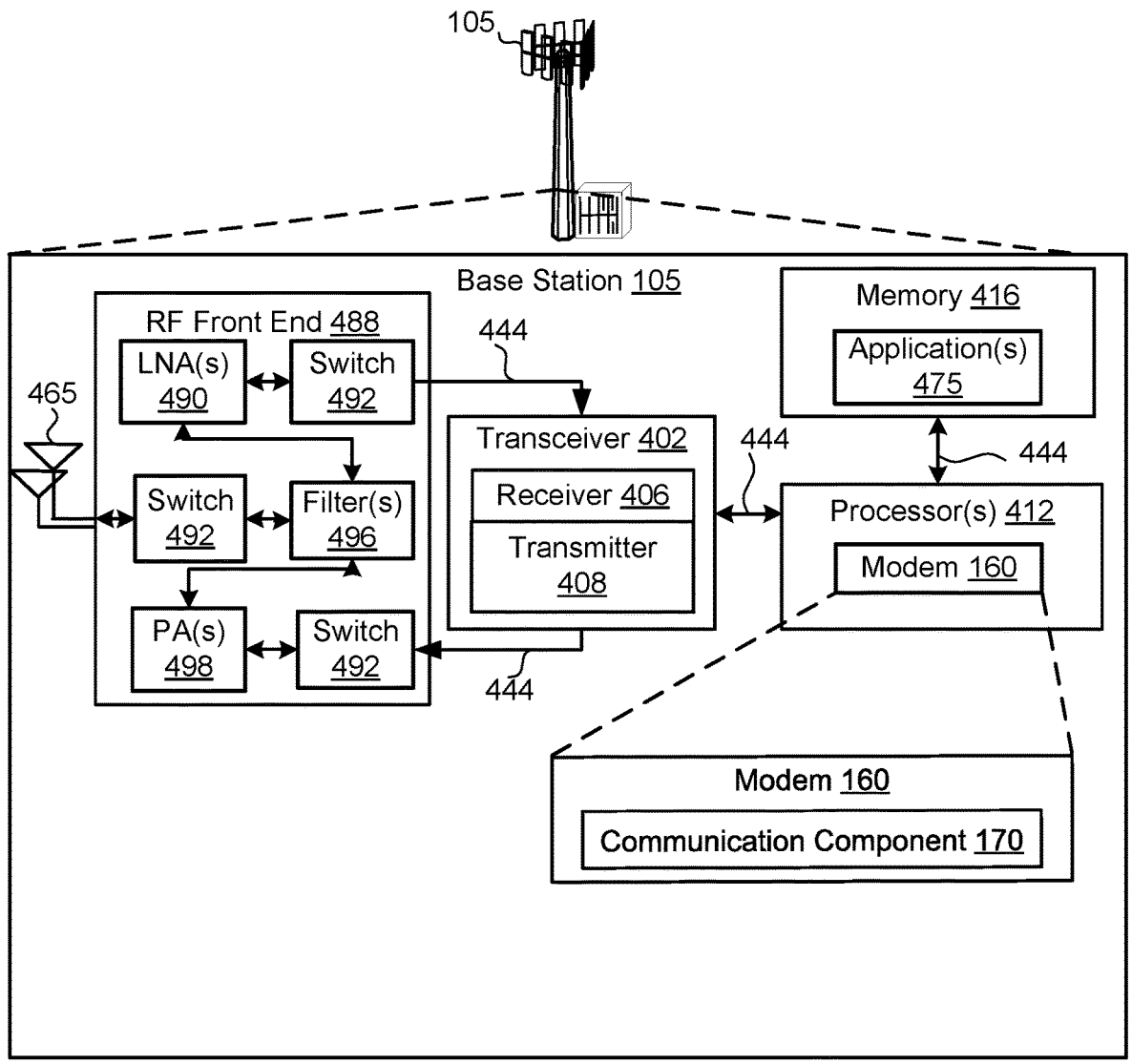
FIG. 4 is a schematic diagram of an example of a base station.

Referring to FIG. 4, one example of an implementation of the base stations 105 may include a variety of components, such as one or more processors 412 and memory 416 and transceiver 402 in communication via one or more buses 444, which may operate in conjunction with modem 160 and the communication component 170 to enable one or more of the functions described herein related to transmitting and receiving data.

In an aspect, the one or more processors 412 may include a modem 160 that uses one or more modem processors. The various functions related to the communication component 170 may be included in modem 160 and/or processors 412 and, in an aspect, may be executed by a single processor, while in other aspects, different ones of the functions may be executed by a combination of two or more different processors. For example, in an aspect, the one or more processors 412 may include any one or any combination of a modem processor, or a baseband processor, or a digital signal processor, or a transmit processor, or a receiver processor, or a transceiver processor associated with transceiver 402. In other aspects, some of the features of the one or more processors 412 and/or modem 160 associated with the communication component 170 may be performed by transceiver 402.

Memory 416 may include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, memory 416 may be a non-transitory computer-readable storage medium that stores one or more computer-executable codes defining the communication component 170 and/or one or more of its subcomponents, and/or data associated therewith, when the relay base station 105 is operating at least one processor 412 to execute the communication component 170 and/or one or more of its subcomponents. The memory 416 may include applications 475 for executing one or more functions associated with the communication component 170.

The transceiver 402 may include at least one receiver 406 and at least one transmitter 408. The receiver 406 may include hardware, firmware, and/or software code executable by a processor for receiving data, the code comprising instructions and being stored in a memory (e.g., computer-readable medium). The receiver 406 may be, for example, a radio frequency (RF) receiver. In an aspect, the receiver 406 may receive signals transmitted by the relay UE 110 and/or the remote UE 112. Additionally, the receiver 406 may process such received signals, and also may obtain measurements of the signals, such as, but not limited to, Ec/Io, SNR, RSRP, RSSI, etc. The transmitter 408 may include hardware, firmware, and/or software code executable by a processor for transmitting data, the code comprising instructions and being stored in a memory (e.g., computer-readable medium). A suitable example of transmitter 408 may including, but is not limited to, an RF transmitter.

Moreover, in an aspect, the base station 105 may include RF front end 488, which may operate in communication with one or more antennas 465 and transceiver 402 for receiving and transmitting radio transmissions, for example, wireless communications transmitted by at least one base station 105 or wireless transmissions transmitted by the relay UE 110. The RF front end 488 may be communicatively coupled with one or more antennas 465 and may include one or more low-noise amplifiers (LNAs) 490, one or more switches 492, one or more power amplifiers (PAs) 498, and one or more filters 496 for transmitting and receiving RF signals.

In an aspect, the LNA 490 may amplify a received signal at a desired output level. In an aspect, each LNA 490 may have a specified minimum and maximum gain values. In an aspect, RF front end 488 may use one or more switches 492 to select a particular LNA 490 with a specific gain value based on a desired gain value for a particular application.

Further, for example, one or more PA(s) 498 may be used by the RF front end 488 to amplify a signal for an RF output at a desired output power level. In an aspect, each PA 498 may have specified minimum and maximum gain values. In an aspect, the RF front end 488 may use one or more switches 492 to select a particular PA 498 and its specified gain value based on a desired gain value for a particular application.

Also, for example, one or more filters 496 may be used by the RF front end 488 to filter a received signal to obtain an input RF signal. Similarly, in an aspect, for example, a respective filter 496 may be used to filter an output from a respective PA 498 to produce an output signal for transmission. In an aspect, each filter 496 may be connected to a specific LNA 490 and/or PA 498. In an aspect, the RF front end 488 may use one or more switches 492 to select a transmit or receive path using a specified filter 496, LNA 490, and/or PA 498, based on a configuration as specified by transceiver 402 and/or processor 412.

As such, transceiver 402 may be configured to transmit and receive wireless signals through one or more antennas 465 via RF front end 488. In an aspect, the transceiver 402 may be tuned to operate at specified frequencies such that the base station 105 may communicate with, for example, another base stations 105 or one or more cells associated with another base stations 105. In an aspect, for example, the modem 160 may configure the transceiver 402 to operate at a specified frequency and power level based on the BS configuration of the base station 105 and the communication protocol used by the modem 160.

In an aspect, the modem 160 may be a multiband-multimode modem, which may process digital data and communicate with the transceiver 402 such that the digital data is sent and received using transceiver 402. In an aspect, the modem 160 may be multiband and be configured to support multiple frequency bands for a specific communications protocol. In an aspect, the modem 160 may be multimode and be configured to support multiple operating networks and communications protocols. In an aspect, the modem 160 may control one or more components of the base station 105 (e.g., RF front end 488, transceiver 402) to enable transmission and/or reception of signals from the network based on a specified modem configuration. In an aspect, the modem configuration may be based on the mode of the modem and the frequency band in use. In another aspect, the modem configuration may be based on BS configuration information associated with the base station 105 as provided by the network during cell selection and/or cell reselection.

Figure 5:
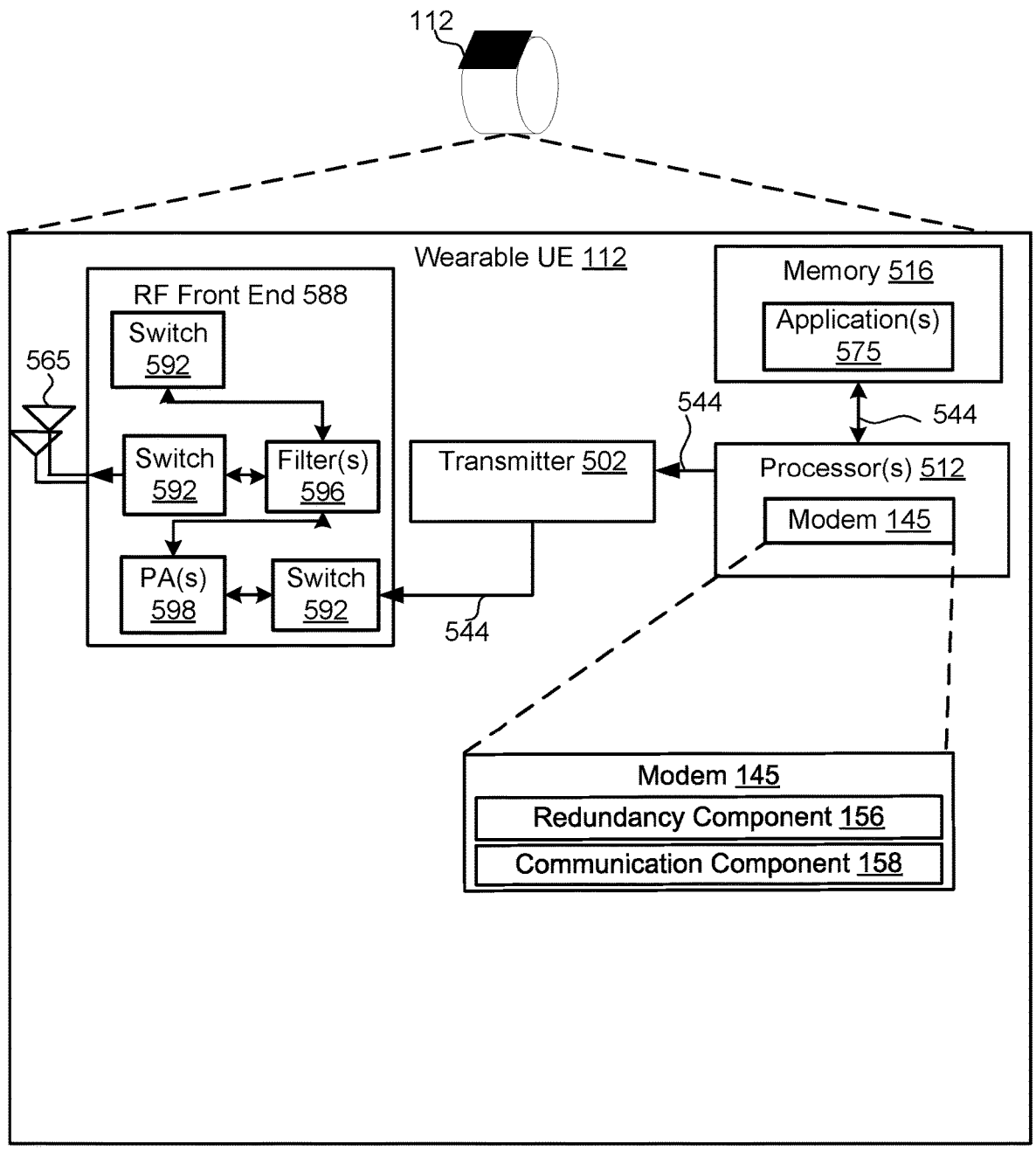
FIG. 5 is a schematic diagram of an example of a remote UE.

Referring to FIG. 5, one example of an implementation of the remote UE 112 may include a variety of components, such as one or more processors 512 and memory 516 and transmitter 502 in communication via one or more buses 544, which may operate in conjunction with modem 145 and the communication component 158 to enable one or more of the functions described herein related to transmitting data.

In an aspect, the one or more processors 512 may include a modem 145 that uses one or more modem processors. The various functions related to the redundancy component 156 and the communication component 158 may be included in modem 145 and/or processors 512 and, in an aspect, may be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transmitter 502. In other aspects, some of the features of the one or more processors 512 and/or modem 145 associated with the redundancy component 156 and the communication component 158 may be performed by the transmitter 502.

Memory 516 may include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, memory 516 may be a non-transitory computer-readable storage medium that stores one or more computer-executable codes defining the redundancy component 156 and/or one or more of its subcomponents, and/or data associated therewith, when remote UE 112 is operating at least one processor 512 to execute the redundancy component 156 and/or one or more of its subcomponents. In another aspect, for example, memory 516 may be a non-transitory computer-readable storage medium that stores one or more computer-executable codes defining the communication component 158 and/or one or more of its subcomponents, and/or data associated therewith, when the remote UE 112 is operating at least one processor 512 to execute the communication component 158 and/or one or more of its subcomponents. The memory 516 may include applications 575 for executing one or more functions associated with the communication component 158 and/or the redundancy component 156.

The transmitter 502 may include hardware, firmware, and/or software code executable by a processor for transmitting data, the code comprising instructions and being stored in a memory (e.g., computer-readable medium). A suitable example of transmitter 502 may including, but is not limited to, an RF transmitter.

Moreover, in an aspect, the remote UE 112 may include RF front end 588, which may operate in communication with one or more antennas 565 and transmitter 502 for transmitting radio transmissions, for example, wireless communications transmitted to at least one base station 105 or wireless transmissions transmitted to the relay UE 110. The RF front end 588 may be communicatively coupled with one or more antennas 565 and may include one or more switches 592, one or more power amplifiers (PAs) 598, and one or more filters 596 for transmitting RF signals.

Further, for example, one or more PA(s) 598 may be used by the RF front end 588 to amplify a signal for an RF output at a desired output power level. In an aspect, each PA 598 may have specified minimum and maximum gain values. In an aspect, the RF front end 588 may use one or more switches 592 to select a particular PA 598 and its specified gain value based on a desired gain value for a particular application.

Also, for example, one or more filters 596 may be used by the RF front end 588 to an output from a respective PA 598 to produce an output signal for transmission. In an aspect, each filter 596 may be connected to a specific PA 598. In an aspect, the RF front end 588 may use one or more switches 592 to select a transmit path using a specified filter 596 and/or PA 598, based on a configuration as specified by transceiver 502 and/or processor 512.

As such, transmitter 502 may be configured to transmit wireless signals through one or more antennas 565 via RF front end 588. In an aspect, the transmitter 502 may be tuned to operate at specified frequencies such that the remote UE 112 may communicate with, for example, one or more base stations 105 or one or more cells associated with one or more base stations 105. In an aspect, for example, the modem 145 may configure the transmitter 502 to operate at a specified frequency and power level based on the UE configuration of the remote UE 112 and the communication protocol used by the modem 145.

In an aspect, the modem 145 may be a multiband-multimode modem, which may process digital data and communicate with the transmitter 502 such that the digital data is sent using transmitter 502. In an aspect, the modem 145 may be multiband and be configured to support multiple frequency bands for a specific communications protocol. In an aspect, the modem 145 may be multimode and be configured to support multiple operating networks and communications protocols. In an aspect, the modem 145 may control one or more components of the remote UE 112 (e.g., RF front end 588, transmitter 502) to enable transmission of signals from the network based on a specified modem configuration. In an aspect, the modem configuration may be based on the mode of the modem and the frequency band in use. In another aspect, the modem configuration may be based on UE configuration information associated with the remote UE 112 as provided by the network during cell selection and/or cell reselection.

Figure 6:
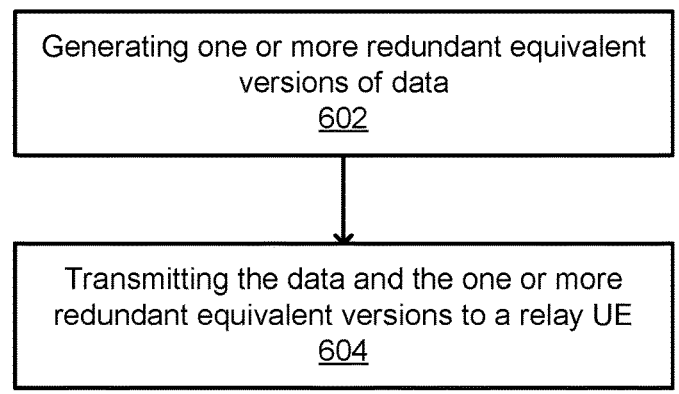
FIG. 6 is a flow diagram of an example method of sending data and redundant versions of the data for transmission.

Referring to FIG. 6, for example, a method 600 of transmitting data includes operating the remote UE 112 including the redundancy component 156 and the communication component 158 according to the above-described aspects and according to one or more of the herein-defined actions. The one or more processors 512 may, in conjunction with the redundancy component 156 and the communication component 158 may perform the one or more of the herein-defined actions.

At block 602, the method 600 may generate one or more redundant equivalent versions of data. For example, the redundancy component 156 of the remote UE 112 may generate, the one or more redundant equivalent versions. For example, the redundancy component 156 of the remote UE 112 may generate three redundant equivalent versions of the data (e.g., 15, 30, and 45), binary numbers 001111, 011110, and 101101, hexadecimal numbers F, 1E, 2D, and decimal numbers 15, 30, and 45, as the one or more redundant equivalent versions sent by a transmitter 502 of the remote UE 112. The one or more redundant equivalent versions of the data may have the same or different representations as the data. In some examples, the one or more redundant equivalent versions of the data may be identical to the data (i.e., decimal number 15, 30, and 45 for all three versions). In certain implementations, the one or more redundant equivalent versions of the data may be encrypted using existing algorithms known to one skilled in the art.

At block 604, the method 600 may transmit the data and the one or more redundant equivalent versions of the data to the relay UE 110. For example, the communication component 158 of the remote UE 112 may transmit, via the one or more antennas 565, the RF front end 588, the transmitter 502, the processor 512, and/or the modem 145, the decimal numbers 15, 30, and 45 as the data and the binary numbers 001111, 011110 and 101101 as the one or more redundant equivalent versions to the relay UE 110. In other examples, the remote UE 112 may transmit the data and the binary numbers 001111, 011110 and 101101 and hexadecimal numbers F, 1E, 2D as the one or more redundant equivalent versions of the data. In yet another example, the remote UE 112 may transmit the data and the binary numbers 001111, 011110 and 101101 and hexadecimal numbers F, 1E, 2D and decimal numbers 15, 30, and 45 as the one or more redundant equivalent versions of the data. The communication component 158, the modem 145, and/or the processor 512 of the remote UE 112 may transmit the data and the redundant equivalent versions of the data to the transmitter 502. The transmitter 502 may convert the data into analog signals. The RF front end 588 may filter, amplify, and package the analog signals sent by the transmitter 502. Next, the RF front end 588 may cause the one or more antennas 565 to emit electro-magnetic signals containing the data to one or more antennas 365 of the relay UE 110.

Figure 7:
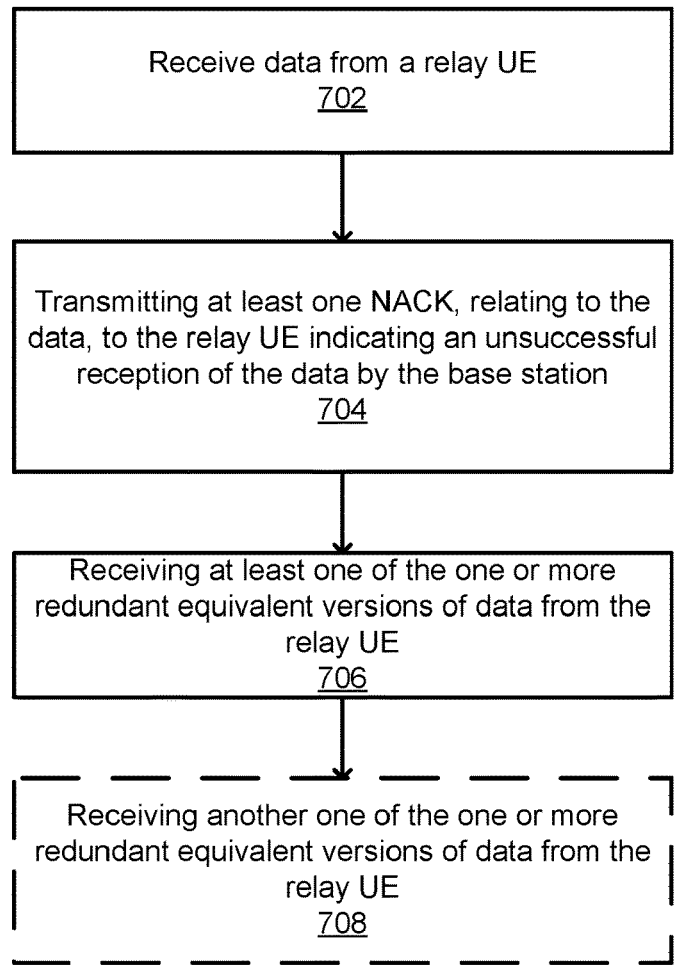
FIG. 7 is a flow diagram of an example method of receiving data and/or redundant versions of the data.

Referring to FIG. 7, for example, a method 700 of receiving data and/or one or more redundant equivalent versions of the data includes operating the base station 105 including the communication component 170 according to the above-described aspects and according to one or more of the herein-defined actions. The one or more processors 412 may, in conjunction with the communication component 170 may perform the one or more of the herein-defined actions.

At block 702, the method 700 may receive data from the relay UE 110. For example, the communication component 170 of the base station 105 may receive, via one or more antennas 465, a RF front end 488, a transceiver 402 or a receiver 406, the processor 412, and/or the modem 160, the data. The one or more antennas 465 may receive electromagnetic signals containing the data from one or more antennas 365 of the relay UE 110. The RF front end 388 may filter, amplify, and/or extract electrical signals carried by the electro-magnetic signals. The transceiver 402 or the receiver 406 may digitize and convert the electrical signal into the data and the one or more redundant equivalent versions of the data. The processor 412, the modem 160, and/or the communication component 170 of the base station 105 may receive the data and/or the data and the one or more redundant equivalent versions of the data from the transceiver 402 or the receiver 406.

In one aspect, the communication component 170 may receive the data. For example, the communication component 170 may receive decimal numbers 15, 30, and 45 as the data sent by the transmitter 308 or the transceiver 302 of the relay UE 110.

At block 704, the method 700 may transmit at least one NACK, relating to the data, to the relay UE indicating an unsuccessful reception of the data by the base station. For example, the communication component 170 of the base station 105 may transmit, via the one or more antennas 565, the RF front end 588, the transceiver 502 or a transmitter 508, the processor 512, and/or the modem 160, the decimal numbers 15, 30, and 45 to the base station 105. The communication component 170, the modem 160, and/or the processor 512 of the base station 105 may transmit the one or more NACK to the transceiver 502 or the transmitter 508. The transceiver 502 or the transmitter 508 may convert the one or more NACK into analog signals. The RF front end 588 may filter, amplify, and package the analog signals sent by the transceiver 502 or the transmitter 508. The RF front end 588 may cause the one or more antennas 565 to emit electro-magnetic signals containing the one or more NACK to one or more antennas 365 of the relay UE 110. The base station 105 may transmit the sub-portions of the one or more NACK according to their priority. The base station 105 may encrypt the one or more NACK before transmission.

At block 706, the method 200 may receive at least one or more redundant equivalent versions of the data from the relay UE 110. For example, the communication component 170 of the base station 105 may receive, via the one or more antennas 565, the RF front end 588, the transceiver 502 or the receiver 506, the processor 512, and/or the modem 160, the at least one or more redundant equivalent versions of the data from the communication component 140 of the relay UE. The one or more antennas 565 may receive electromagnetic signals containing the at least one or more redundant equivalent versions of the data from one or more antennas 365 of the relay UE 110. The RF front end 588 may filter, amplify, and/or extract electrical signals carried by the electro-magnetic signals. The transceiver 502 or the receiver 506 may digitize and convert the electrical signal into the at least one or more redundant equivalent versions of the data. The processor 512, the modem 160, and/or the communication component 170 of the base station may receive the at least one or more redundant equivalent versions of the data from the transceiver 502 or the receiver 506.

In an aspect, the communication component 170 may receive the binary numbers 001111, 011110 and 101101 from the relay UE 110. For example, the communication component 170 may receive the binary numbers 001111, 011110 and 101101 from the relay UE 110 after the base station 105 transmits the predetermined threshold number of consecutive NACKs, such as 4 NACKs. The at least one of the one or more redundant equivalent versions of the data may be utilized by the base station 105 to reconstruct the data and/or recover contents of the data. The at least one of the one or more redundant equivalent versions of the data may decrease the chance of loss data. The base station 105 may receive any sub-portions of the data according to their priority.

At block 708, the method 200 may optionally receive another one of the one or more redundant equivalent versions of the data from the relay UE 110. For example, the communication component 170 of the base station 105 may receive, via the one or more antennas 565, the RF front end 588, the transceiver 502 or the receiver 506, the processor 512, and/or the modem 160, the at least one or more redundant equivalent versions of the data from the communication component 140 of the relay UE. The one or more antennas 565 may receive electro-magnetic signals containing another one of the at least one or more redundant equivalent versions of the data from one or more antennas 365 of the relay UE 110. The RF front end 588 may filter, amplify, and/or extract electrical signals carried by the electro-magnetic signals. The transceiver 502 or the receiver 506 may digitize and convert the electrical signal into another one of the at least one or more redundant equivalent versions of the data. The processor 512, the modem 160, and/or the communication component 170 of the base station may receive another one of the at least one or more redundant equivalent versions of the data from the transceiver 502 or the receiver 506.

In an aspect, the communication component 170 may receive the hexadecimal numbers F, 1E, 2D from the relay UE 110. For example, the communication component 170 may receive the hexadecimal numbers F, 1E, 2D from the relay UE 110 after the base station 105 transmits the predetermined threshold number of consecutive NACKs, such as 4 NACKs. The other one of the one or more redundant equivalent versions of the data may be utilized by the base station 105 to reconstruct the data and/or recover contents of the data. The other one of the one or more redundant equivalent versions of the data may decrease the chance of loss data. The base station 105 may receive any sub-portions of the data according to their priority.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of relaying data by a relay user equipment (UE), comprising:
   receiving data from a remote user equipment;
   buffering the data and one or more equivalent representations of the data, wherein at least a portion of at least one of the one or more equivalent representations of the data comprises a different representation of a corresponding portion of the data;
   transmitting the data to a base station;
   receiving at least one negative acknowledgement, relating to the data, from the base station indicating an unsuccessful reception of the data by the base station; and
   transmitting, in response to receiving the at least one negative acknowledgement, at least the one of the one of the one or more equivalent representations of the data to the base station.

2. The method of claim 1, further comprising receiving additional negative acknowledgements from the base station indicating the unsuccessful reception of the data by the base station before transmitting the at least one of the one or more equivalent representations of the data to the base station.

3. The method of claim 1, further comprising,
   receiving an additional negative acknowledgement from the base station indicating an unsuccessful reception of the at least one of the one or more equivalent representations of the data by the base station, and
   transmitting another one of the one or more equivalent representations of the data to the base station, wherein the another one of the one or more equivalent representations of the data is another different representation of the data that is also different from the at least one of the one or more equivalent representations of the data.

4. The method of claim 1, wherein:
   the data includes timing data indicating a permissible delay before transmitting the data; and
   the transmission of the data occurs prior to the permissible delay.

5. The method of claim 1, wherein the data includes:
a first portion and a second portion; and
priority data indicating a priority in transmission between the first portion and the second portion of the data.

6. The method of claim 1, further comprising encrypting the data before transmitting.

7. The method of claim 1, and further:
wherein the corresponding portion of the data and the portion of the at least one of the one or more equivalent representations of the data as buffered are indicative of a same numerical value, such that in the data as buffered the same numerical value is indicated as a first representation of the same numeral, and such that in the at least one of the one or more equivalent representations of the data the same numerical value is indicated as a second representation of the same numeral, and
wherein the first representation of the same numeral and the second representation of the same numeral are different representations of the same numeral selected from a group of different representations of the same numeral comprising a decimal representation of the same numeral, a binary representation of the same numeral, and hexadecimal representation of the same numeral.

8. A relay user equipment (UE) for relaying data, comprising:
a memory storing instructions;
a transceiver; and
one or more processors coupled with the memory and the transceiver, and configured to execute the instructions to:
receive, via the transceiver, data from a remote user equipment;
buffer the data and one or more equivalent representations of the data, wherein at least a portion of at least one of the one or more equivalent representations of the data comprises a different representation of a corresponding portion of the data;
transmit, via the transceiver, the data to a base station;
receive at least one negative acknowledgement, relating to the data, from the base station indicating an unsuccessful reception of the data; and
transmit, via the transceiver, in response to receiving the at least one negative acknowledgement, at least the one of the one or more equivalent representations of the data to the base station.

9. The relay user equipment of claim 8, wherein the one or more processors are further configured to receive, via the transceiver, additional negative acknowledgements from the base station indicating the unsuccessful reception of the data by the base station before transmitting the at least one of the one or more equivalent representations of the data to the base station.

10. The relay user equipment of claim 8, wherein the one or more processors are further configured to:
receive, via the transceiver, an additional negative acknowledgement from the base station indicating an unsuccessful reception of the at least one of the one or more equivalent representations of the data by the base station, and
transmit, via the transceiver, another one of the one or more equivalent representations of the data to the base station, wherein the another one of the one or more equivalent representations of the data is another different representation of the data that is also different from the at least one of the one or more equivalent representations of the data.

11. The relay user equipment of claim 8, wherein:
the data includes timing data indicating a permissible delay before transmitting the data; and
the transmission of the data occurs before the permissible delay.

12. The relay user equipment of claim 8, wherein the data includes:
a first portion and a second portion; and
priority data indicating a priority in transmission between the first portion and the second portion of the data.

13. The relay user equipment of claim 8, wherein the one or more processors are further configured to encrypt the data before transmitting.

14. The relay user equipment of claim 8, and further:
wherein the corresponding portion of the data and the portion of the at least one of the one or more equivalent representations of the data as buffered are indicative of a same numerical value, such that in the data as buffered the same numerical value is indicated as a first representation of the same numeral, and such that in the at least one of the one or more equivalent representations of the data the same numerical value is indicated as a second representation of the same numeral, and
wherein the first representation of the same numeral and the second representation of the same numeral are different representations of the same numeral selected from a group of different representations of the same numeral comprising a decimal representation of the same numeral, a binary representation of the same numeral, and hexadecimal representation of the same numeral.

15. A non-transitory computer readable medium including instructions that, when executed by one or more processors of a relay user equipment (UE), cause the one or more processor to:
receive data from a remote user equipment;
transmit the data to a base station;
receive at least one negative acknowledgement, relating to the data, from the base station indicating an unsuccessful reception of the data; and
transmit in response to receiving the at least one negative acknowledgement, at least one of one of the one or more equivalent representations of the data to the base station, wherein at a portion of the at least one of the one or more equivalent representations of the data comprises a different representation of a corresponding portion of the data.

16. The non-transitory computer readable medium of claim 15, further comprising instructions that, when executed by the one or more processors, cause the one or more processor to receive additional negative acknowledgements from the base station indicating the unsuccessful reception of the data by the base station before transmitting the at least one of the one or more equivalent representations of the data to the base station.

17. The non-transitory computer readable medium of claim 15, further comprising instructions that, when executed by the one or more processors, cause the one or more processor to:
receive an additional negative acknowledgement from the base station indicating an unsuccessful reception of the at least one of the one or more equivalent representations of the data by the base station, and
transmit another one of the one or more equivalent representations of the data to the base station, wherein the another one of the one or more equivalent representations of the data is another different representation of the data that is also different from the at least one of the one or more equivalent representations of the data.

18. The non-transitory computer readable medium of claim 15, wherein:
the data includes timing data indicating a permissible delay before transmitting the data; and
the transmission of the data occurs before the permissible delay.

19. The non-transitory computer readable medium of claim 15, wherein the data includes:
a first portion and a second portion; and
priority data indicating a priority in transmission between the first portion and the second portion of the data.

20. The non-transitory computer readable medium of claim 15, further comprising instructions that, when executed by the one or more processors, cause the one or more processor to encrypt the data before transmitting.

21. The non-transitory computer readable medium of claim 15, and further:
wherein the corresponding portion of the data and the portion of the at least one of the one or more equivalent representations of the data as buffered are indicative of a same numerical value, such that in the data as buffered the same numerical value is indicated as a first representation of the same numeral, and such that in the at least one of the one or more equivalent representations of the data the same numerical value is indicated as a second representation of the same numeral, and
wherein the first representation of the same numeral and the second representation of the same numeral are different representations of the same numeral selected from a group of different representations of the same numeral comprising a decimal representation of the same numeral, a binary representation of the same numeral, and hexadecimal representation of the same numeral.

22. A relay user equipment (UE) for relaying data, comprising:
means for receiving data from a remote user equipment;
means for buffering the data and one or more equivalent representations of the data wherein at a portion of the least one of the one or more equivalent representations of the data comprises a different representation of a corresponding portion of the data;
means for transmitting the data to a base station;
means for receiving at least one negative acknowledgement, relating to the data, from the base station indicating an unsuccessful reception of the data by the base station; and
means for transmitting, in response to receiving the at least one negative acknowledgement, at least the one of the one of the one or more equivalent representations of the data to the base station.

23. The relay user equipment of claim 22, further comprises means for receiving additional negative acknowledgements from the base station indicating the unsuccessful reception of the data by the base station before transmitting the at least one of the one or more equivalent representations of the data to the base station.

24. The relay user equipment of claim 22, further comprises:
means for receiving an additional negative acknowledgement from the base station indicating an unsuccessful reception of the at least one of the one or more equivalent representations of the data by the base station, and
means for transmitting another one of the one or more equivalent representations of the data to the base station, wherein the another one of the one or more equivalent representations of the data is another different representation of the data that is also different from the at least one of the one or more equivalent representations of the data.

25. The relay user equipment of claim 22, wherein:
the data includes timing data indicating a permissible delay before transmitting the data; and
the transmission of the data occurs prior to the permissible delay.

26. The relay user equipment of claim 22, wherein the data includes:
a first portion and a second portion; and
priority data indicating a priority in transmission between the first portion and the second portion of the data.

27. The relay user equipment of claim 22, further comprises means for encrypting the data before transmitting.

28. The relay user equipment of claim 22, and further:
wherein the corresponding portion of the data and the portion of the at least one of the one or more equivalent representations of the data as buffered are indicative of a same numerical value, such that in the data as buffered the same numerical value is indicated as a first representation of the same numeral, and such that in the at least one of the one or more equivalent representations of the data the same numerical value is indicated as a second representation of the same numeral, and
wherein the first representation of the same numeral and the second representation of the same numeral are different representations of the same numeral selected from a group of different representations of the same numeral comprising a decimal representation of the same numeral, a binary representation of the same numeral, and hexadecimal representation of the same numeral.

* * * * *